UNITED STATES PATENT OFFICE.

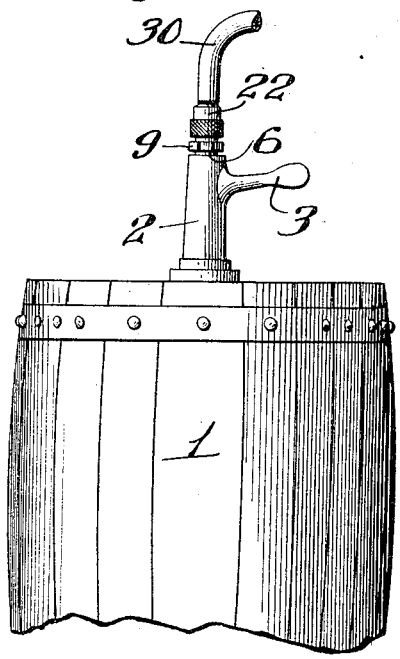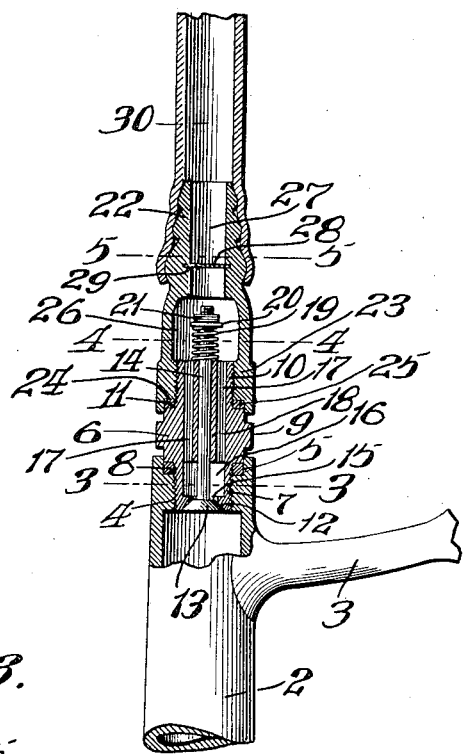

AUGUST HAHN, OF ST. LOUIS, MISSOURI.

AIR-INLET FOR BEER-KEGS.

1,013,158.  Specification of Letters Patent.  Patented Jan. 2, 1912.

Application filed October 13, 1910. Serial No. 586,830.

*To all whom it may concern:*

Be it known that I, AUGUST HAHN, a citizen of the United States of America, residing in the city of St. Louis and State of Missouri, have invented certain new and useful Improvements in Air-Inlets for Beer-Kegs, of which the following is a full, clear, and exact description, reference being had to the accompanying drawings, forming part of this specification.

An object of the present invention is to provide an air inlet for beer kegs having a valve, which will not be affected by the chemical action of the liquid.

A further object of the present invention is to provide such an air inlet having a simple indestructible interior construction; and a still further object of the present invention is to provide an air inlet which will be more effective in its operation, may be more easily cleansed, which will be less likely to become clogged with dust, dirt or other foreign matter, and which will be less likely to become gummed with the liquid to be dispensed.

In air inlets of this character heretofore, it has very commonly been the custom to provide the inlet with a valve consisting of a flexible collapsed tube connected to the lower end of the nozzle below its screw thread and adapted to be acted upon by the pressure within the keg to close such valve, such valve being opened by an increase in the pressure in the charging pipe connected to the vent over the pressure in the keg. In other words, so long as the pressure in the keg equals or exceeds that in the charging pipe, the valve remains closed. The principal objection to this formerly much used type of valve is two-fold. In the first place, the rubber valve becomes easily rotted and destroyed; in the second place, the liquid or beer in the keg becomes trapped in said rubber valve, sours, and contaminates the beer or liquid in the keg. Furthermore, in beer keg air inlets as heretofore made, no means has been provided for preventing the entrance of particles of dust, dirt or other foreign matter through the charging pipe past the valve into the liquid, such matter sometimes entering the air inlet to such an extent as to prevent the perfect operation of the valve. A valve constructed in accordance with my invention obviates all these defects.

My valve is clearly described in the following specification and illustrated in the accompanying drawings, in which like reference characters refer to like parts, and in which—

Figure I is a view partly broken away of a keg furnished with one of my improved air inlets, showing the keg partly broken away and showing, also, a portion of the charging pipe connected to the air inlet. Fig. II is an enlarged longitudinal sectional view through the valve and nozzle portions of my improved air inlet, showing a portion of the air inlet removed and also showing a portion of the charging pipe connected to the nozzle. Fig. III is a transverse section on line III—III, Fig. II. Fig. IV is a like view on line IV—IV, Fig. II. Fig. V is a like view on line V—V, Fig. II.

Referring now in detail to the drawings: 1 represents a metallic keg, or other receptacle, for beer or other liquid, 2 is the connecting portion of my improved air inlet having a handle 3 extending laterally therefrom, as customary heretofore, and provided at its upper end with a screw threaded socket 4, with a surrounding annular gasket or washer recess 5.

6 is the valve housing portion of my improved air inlet, provided with a screw threaded nipple 7 engaging the socket 4, and carrying a washer or gasket 8 which seats in the recess 5 and insures a tight connection between the connector 2 and the housing 6.

The housing 6 is preferably formed with an operating nut 9 and an upper nipple 10, screw threaded, and provided with an annular washer or gasket seat 11. The nipple 7 of the housing 6 is provided with a valve seat 12 which is beveled and receives a valve 13 having a stem 14. The valve seat 12 surrounds a port 15 giving entrance to a chamber 16 in the housing 6, which entrance, through means of radially arranged passages or ports 17, is connected with the nipple portion 22 of the air inlet, later described. Extending through the housing 6 is a perforation 18 which receives the valve stem 14 and guides the same in its reciprocating movement.

19 is a spring carried by the upper end of the stem 14, bearing against a spring abutment 20 connected to the stem 14 by a nut 21 screw threaded to the upper part of the stem. The spring 19, which is the operating spring of the valve, finds its second abutment on the upper end of the nipple 10 of the housing 6.

22 is the nipple portion of the air inlet which is provided with a screw threaded socket 23 to receive the nipple 10 of the housing 6 and an annular gasket or washer seat 24 surrounding said socket to receive a gasket or washer 25. The nipple portion 22 also has formed above the socket 23 a chamber 26 in which the upper end of the valve stem 14 reciprocates, and which constitutes a communicating passageway between the radially arranged ports 17 and the throughway 27 in the nipple 22.

28 is a screen seated in the annular recess 29, surrounding the through-way 27 in the nipple 22 and which is forced or warped into the recess 29 through the through-way 27. Of course, the nipple portion 22 is provided with the usual exterior annular corrugations to receive the flexible charging pipe 30.

From the foregoing, it will be observed that the nipple portion 22 may be separated from the housing 6, and the housing 6 from the connecting portion 2, so that the entire air inlet may be thoroughly cleansed. The spring 19 normally has a tendency to hold the valve 13 against its seat 12, but upon decrease in the pressure within the keg or receptacle 1, the pressure in the pipe 30 overcoming the spring 19, opens the valve 13 until the pressures in the pipe 30 and in the keg 1 are equal. In my improved air inlet, the surface of the valve has an exceedingly small area. In the old rubber form of valves, it was of sufficient area to insure effective closing, whereupon stale beer accumulated therein. In the present case, there is no opportunity for the accumulation of stale beer within the valve housing or valve, owing to the fact that we have a far more positive valve, and one exceedingly firm in action. It will be obvious that the air inlet just described is also very durable and not likely to get out of order.

Since the valve 13 is located at the lower end of the housing 6, and the spring 19 at the upper end of the housing 6, the two parts being separated by narrow passages or ports 17, arranged radially about the valve stem and extending the greater part of the length of the housing 6, the spring 19 is kept free from contact with, or the influence of, beer or other liquid to be dispensed, for there is far less likelihood of any beer which might get by the valve 13 working its way up through narrow or attenuated passages or ports to contact with and gum the spring than if the connection between the nipple portion 22 and the chamber 16 consisted of a single larger passage or port. The reason for this is that with a given air pressure, the smaller the throughway through which such pressure passes, the greater the velocity of the pressure, and hence the more effectively will such throughway be kept free from liquid.

Having thus described my invention, the following is what I claim as new therein and desire to secure by Letters Patent:

The combination with a connector and a hose nipple provided with an enlarged socket, of a coupling co-axial with and having its ends connected respectively with said nipple and connector, said coupling having a nipple projecting into said socket and provided with a central valve stem aperture, a valve seat at the other end of said coupling, said coupling being provided with a central aperture and a chamber adjacent said valve seat, ports arranged circularly around said aperture and extending through said coupling, a valve provided with a stem reciprocable through said aperture and projecting into the socket of said nipple, and a spring on the projecting end of said valve stem, said spring being secured to the end of said stem and having its other end abutting against the coupling nipple.

AUGUST HAHN.

In the presence of—
HARRY A. KNIGHT,
M. C. HAMMON.